(12) United States Patent
Velusamy

(10) Patent No.: US 9,418,554 B2
(45) Date of Patent: Aug. 16, 2016

(54) METHOD AND SYSTEM FOR DETERMINING ROAD CONDITIONS BASED ON DRIVER DATA

(71) Applicant: Verizon Patent and Licensing Inc., Arlington, VA (US)

(72) Inventor: Umashankar Velusamy, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 147 days.

(21) Appl. No.: 14/453,721

(22) Filed: Aug. 7, 2014

(65) Prior Publication Data
US 2016/0042644 A1 Feb. 11, 2016

(51) Int. Cl.
| | |
|---|---|
| *B60Q 1/00* | (2006.01) |
| *G08G 1/16* | (2006.01) |
| *H04W 4/02* | (2009.01) |
| *H04W 4/04* | (2009.01) |
| *H04L 29/08* | (2006.01) |
| *G08B 5/36* | (2006.01) |

(52) U.S. Cl.
CPC ........ *G08G 1/162* (2013.01); *G08B 5/36* (2013.01); *G08G 1/165* (2013.01); *H04L 67/12* (2013.01); *H04W 4/027* (2013.01); *H04W 4/046* (2013.01)

(58) Field of Classification Search
CPC ......... G08G 1/162; G08G 1/165; G08B 5/36; H04L 67/12; H04W 4/027; H04W 4/046
USPC .......................................................... 340/435
See application file for complete search history.

(56) References Cited

U.S. PATENT DOCUMENTS

| | | | | |
|---|---|---|---|---|
| 2007/0265768 A1* | 11/2007 | Brown | .................... | B60R 11/02 701/532 |
| 2010/0332131 A1* | 12/2010 | Horvitz | .............. | G01C 21/3697 701/414 |
| 2013/0173208 A1* | 7/2013 | Kuzunishi | ............... | E01C 23/01 702/141 |
| 2014/0160295 A1* | 6/2014 | Kyomitsu | ............ | G08G 1/0112 348/159 |

* cited by examiner

Primary Examiner — Kerri McNally

(57) ABSTRACT

A system and method for determining adverse/dangerous road conditions based on sensor data received from a vehicle and generating alerts for other vehicles which may encounter the same condition. The system receives sensor data from a vehicle and evaluates the data to determine if the vehicle encountered a potentially dangerous road condition. The system may apply one or more thresholds to the data, where the thresholds are designed to detect various sudden movements of the vehicle. The system may monitor the location associated with the potentially dangerous road condition and evaluate sensor data from one or more other vehicles that drive near the same location to determine whether they encounter a similar condition. The system may generate one or more alerts and transmit those alerts to vehicles that are approaching the location of the dangerous condition using location data provided by the approaching vehicles.

20 Claims, 5 Drawing Sheets

METHOD AND SYSTEM FOR DETERMINING ROAD CONDITIONS BASED ON DRIVER DATA

RELATED APPLICATIONS

The field of the present application relates generally to a method and system for determining road conditions using sensor information and providing alerts to nearby drivers. The present application relates to U.S. application Ser. No. 12/840,821, filed on Jul. 21, 2010, U.S. application Ser. No. 14/215,183, filed on Mar. 17, 2014, and U.S. application Ser. No. 14/217,908, filed on Mar. 18, 2014, the disclosures of which are incorporated by reference herein in their entirety.

BACKGROUND

Many modern vehicles have a telematics control unit or an on-board diagnostics device installed. These devices gather data and occasionally transmit messages to drivers of the vehicle. The data may be sent to a remote server. Additionally, drivers can send messages to a server to report accidents and traffic problems.

BRIEF DESCRIPTION OF THE DRAWINGS

In order to facilitate a fuller understanding of the exemplary embodiments, reference is now made to the appended drawings, in which like reference characters are used to indicate like elements. These drawings should not be construed as limiting, but are intended to be exemplary only.

DETAILED DESCRIPTION OF EMBODIMENTS

Figure 1:
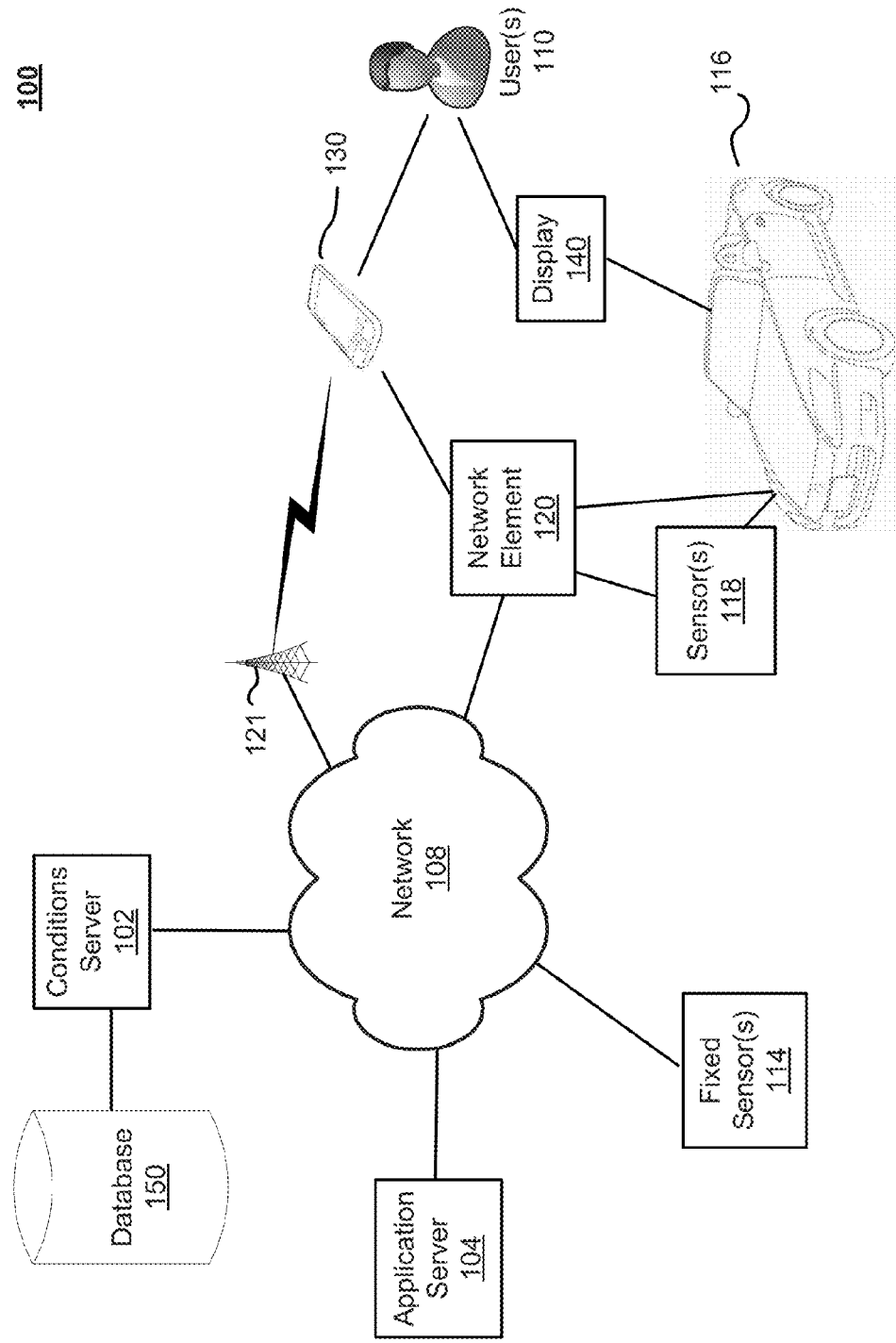
FIG. 1 depicts a block diagram of a system architecture for determining road conditions based on driver data, according to an example embodiment.

Systems and methods are disclosed for determining road conditions based on data received from multiple user mobile devices and vehicle sensors. Each mobile device may be associated with a user and a user vehicle. The mobile device may receive data from vehicle sensors and local fixed sensors. The mobile device may have its own sensors. The mobile devices may transmit the sensor data to a remote system. The remote system may compare sensor data received from multiple mobile devices to determine whether the data correlates to the same geographical location. The system may determine, based on the data, that a dangerous road condition is present at the geographical location (e.g., a pothole, standing water, ice patch, weakened bridge beams or softening road surface). The system may generate one or more work orders to repair the road condition. The system may generate one or more alerts for other mobile devices and vehicles that are approaching the site of the dangerous road condition. The system may transmit alerts to the other mobile devices based on their detected location relative to the dangerous condition.

The description below describes modules that may include one or more servers, databases, subsystems and other components. As used herein, the term "module" may be understood to refer to non-transitory executable software, firmware, processor or other hardware, and/or various combinations thereof. Modules, however, are not to be interpreted as software that is not implemented on hardware, firmware, or recorded on a tangible processor-readable or recordable storage medium (i.e., modules are not software per se). The modules are exemplary and may be combined, integrated, separated, and/or duplicated to support various applications and may be centralized or distributed. A function described herein as being performed at a particular module may be performed at one or more other modules and/or by one or more other devices instead of or in addition to the function performed at the particular module. The modules may be implemented across multiple devices and/or other components local or remote to one another. The devices and components that comprise one module may or may not be distinct from the devices and components that comprise other modules.

Embodiments of the system provide the ability to gather data from a user, a device associated with user(s), vehicle(s), fixed sensors, and/or third party sources, for the exemplary purpose of determining road conditions and providing alerts to one or more users. As used herein, the term "alert" may be interpreted as a notification, a prompt, or a request. Alerts may be one-to-one, one-to-many, many-to-one, or many-to-many. One exemplary embodiment relates to a driver of a vehicle and gathering data from a telematics control unit ("TCU device") on the vehicle, from the user him/herself, from a device of the user (such as a mobile device), from various fixed sensors, and/or from various third parties to determine road conditions and provide alerts to the driver or another user.

Referring to FIG. 1, a schematic diagram of a system 100 for gathering data from various sources or devices is shown, according to an exemplary embodiment. As illustrated, network 108 may be communicatively coupled with one or more alert displaying devices, one or more data transmitting devices or entities, network element 120, or wireless transceiver 121. Exemplary alert displaying devices may include a mobile device 130, vehicle display 140, or network element 120, for example. These and other types of alert displaying devices may be communicatively coupled directly with network 108 or via one or more intermediary devices, such as transceiver 121 or network element 120.

It should be appreciated that the system 100 of FIG. 1 may be implemented in a variety of ways. Architecture within system 100 may be implemented as a hardware component (e.g., as a module) within a network element or network box. It should also be appreciated that architecture within system 100 may be implemented in computer executable software (e.g., on a tangible computer-readable medium). Module functionality of architecture within system 100 may be located on a single device or distributed across a plurality of devices including one or more centralized servers and one or more mobile units or end user devices.

Network 108 may be a wireless network, a wired network or any combination of wireless network and wired network. For example, network 108 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. In addition, network 108 may include, without limitation, telephone line, fiber optics, IEEE Ethernet 802.3, a wide area network ("WAN"), a local area network ("LAN"), or a global network such as the Internet. Also, network 108 may support, an Internet network, a wireless communication network, a cellular network, Bluetooth, or the like, or any combination thereof. In various embodiments, network 108 may be a 4G network that complies with the International Mobile Telecommunications Advanced (IMT-Advanced) specification. Network 108 may be a Long Term Evolution (LTE) network. Network 108 may be a LTE Advanced (LTE-A) network. Network 108 may be a Mobile WiMAX (IEEE 802.16e). Network 108 may be a Mobile WiMAX Release 2 (IEEE 802.16m) network.

Network 108 may further include one, or any number of the exemplary types of networks mentioned above operating as a stand-alone network or in cooperation with each other. Network 108 may utilize one or more protocols of one or more network elements to which it is communicatively coupled. Network 108 may translate to or from other protocols to one or more protocols of network devices. Although network 108 is depicted as one network, it should be appreciated that according to one or more embodiments, network 108 may comprise a plurality of interconnected networks, such as, for example, a service provider network, the Internet, a broadcaster's network, a cellular network, corporate networks, municipal networks, government networks, or home networks.

Mobile device 130 may be a mobile communications device, a smartphone, a tablet computer, a wearable computer such as in the form of a wrist watch, bracelet, or glasses, a home phone, a cellular phone, a mobile phone, a satellite phone, a personal digital assistant, a computer, a handheld multimedia device, a personal media player, a gaming device, a mobile television, or other devices capable of displaying alerts and communicating with network element 120, directly with network 108 or via transceiver 121. Mobile device 130, sensor(s) 118, and vehicle display 140 may connect to network 108 and communicate with other network elements, servers or providers using WiFi, 3G, 4G, Bluetooth, or other chipsets. Mobile device 130 may receive sensor data from vehicle 116 and/or sensor 118, and transmit the sensor data to conditions server 102.

Transceiver 121 may be a repeater, a microwave antenna, a cellular tower, or another network access device capable of providing connectivity between different network mediums. Transceiver 121 may be capable of sending or receiving signals via a mobile network, a paging network, a cellular network, a satellite network or a radio network. Transceiver 121 may provide connectivity to one or more wired networks and may be capable of receiving signals on one medium such as a wired network and transmitting the received signals on a second medium, such as a wireless network.

Network element 120 may include one or more processors (not shown) for recording, transmitting, receiving, or storing data. Network element 120 may transmit and receive data to and from network 108. The data may be transmitted and received utilizing a standard telecommunications protocol or a standard networking protocol. For example, one embodiment may utilize text messages and/or a Short Message Service "SMS." In other embodiments, the data may be transmitted or received utilizing Session Initiation Protocol ("SIP"), Voice Over IP ("VoIP"), or other messaging protocols. Data may also be transmitted or received using Wireless Application Protocol ("WAP"), Multimedia Messaging Service ("MMS"), Enhanced Messaging Service ("EMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection. A number of different types of signals or alerts may be transmitted via network 108 including, but not limited to, alerts indicative of information content, such as a text message, a voice message (including computer generated voice messages), an email, an alert, a prompt, a notification, a banner, a pop-up, a video signal, a link, a vibration pattern, a visual light signal, a ring tone, or any combination of the foregoing.

Fixed sensor(s) 114 may represent one or more sensors that provide data to conditions server 102. Fixed sensor(s) 114 may be similar to sensors 118 and gather similar data. Fixed sensor(s) 114 may provide map data, location data, geographic data, environmental data (such as the current weather conditions), image and video data, traffic data, accident data, or other forms of data. Fixed sensor 114 may be a camera. Each fixed sensor 114 may be associated with a specific geographic location that is known to conditions server 102. Sensor 114 may be an infrared sensor that measures the speed of passing vehicles.

Application server 104 may provide an application to a computing device such as mobile device 130 and/or vehicle display 140, for example. Via an application installed on the mobile device 130 and/or vehicle display 140, the user may establish various user settings, including privacy and tracking settings. The application may be, or may be linked to, a third-party application, such as a maps application. Also, the application may be a social media add-on such that it operates in conjunction with a social media application, but may nevertheless be maintained by an entity other than the social media entity.

User settings may be established by the user within the application, or using an associated website on the Internet, and may be stored on the computing device (e.g., mobile device 130 or vehicle display 140), on application server 104, in database 150, or in user profile module 206. The user settings and may be retrieved by input module 202 and used by sensor module 204, alert module 208, and/or analytics module 210 when performing the various operations described herein.

User(s) 110 may be a user of a computing device, a person or computing device that receives an alert, or a driver of vehicle 116, for example. User(s) 110 may be singular or plural.

Vehicle display 140 may include a display in vehicle 116, such as a touchscreen device or a dashboard display, including a plasma display panel (PDP), liquid crystal display (LCD), thin film transistor (TFTLCD), super LCD, light emitting diode (LED), organic LED (OLED), active matrix OLED (AMOLED), LED-backlit LCD, super AMOLED, a retina display, or a heads-up-display (HUD).

Sensor(s) 118 in FIG. 1 may include one or more TCU devices that monitor parameters of vehicle 116. The TCU device also may include sensors, such as, for example, accelerometers, speakers or microphone, or connections for same.

In addition, a user's mobile device 130 may include sensors and may supplant some, or all, of the features and functionality of a TCU that a vehicle's manufacture installed at the factory, or that may be performed by an aftermarket telematics device that couples to a diagnostic port of a vehicle. In various embodiments, a TCU device may provide substantially all of the data relating to the vehicle and its location, motion, or acceleration. The TCU device may collect large amounts of data regarding the vehicle 116 to which it is attached, including: location (GPS, GLONASS), engine status, speed, stops, starts, temperature, acceleration values, nearby Wi-Fi signals, accelerometer data, brake applications, gyroscope sensor information, height information from an altimeter, visual information from a camera communicatively coupled to the TCU device, audio from a microphone, or revolutions per minute (RPM) of the vehicle's engine, for example. Data may be gathered from multiple TCU devices on multiple vehicles, and it should be appreciated that "TCU device" may refer to "one or more TCU devices." Such data may be gathered anonymously. The data may be gathered in response to a command from user 110. The data may be automatically gathered at regular intervals. The data may be gathered based on remote signals received from conditions server 102. The TCU device may include a number of sensors including an accelerometer, barometer, altimeter, and gyroscope, for example. Sensors within mobile device 130 may similarly include an accelerometer, gyroscope, or GPS sensor, for example.

Exemplary data that may be captured by the TCU device over a period of time includes location (e.g., latitude, longitude and/or altitude), heading (e.g., degrees), weather conditions (e.g., degrees, precipitation), whether the window wipers are on/off, vehicle speed, vehicle status, whether the headlights are on/off, application of brakes, wheel slippage, skidding, sliding, rate of acceleration (measured in g's in the x, y, z directions, for example), pressure values (e.g., kPa), altitude, grade (rate of incline/decline), forces at wheels, use of the vehicle's horn, damping forces, fuel consumption, etc. All or a subset of this data may be used by the conditions server 102 to determine road conditions and generate alerts.

Location data may be collected and/or generated every 1-2 seconds, for example, by a GPS module within the TCU device or mobile device 130. Acceleration data may be collected by an accelerometer at 50 Hz, for example, and pressure data may be collected by a barometer at 10 Hz, for example. All of the collected sensor data may have a timestamp and location-stamp associated with it to indicate when and where the data was collected, and this timestamp and location-stamp may be tagged to the data itself, and eventually stored with the data in database 150. Data may be collected continuously over a period of time until the vehicle is turned off or until the user directly or indirectly deactivates the TCU device, or more generally, sensor(s) 118. Sensor data may be stored locally in a storage medium at vehicle 116 and/or in network element 120. The sensor data stored at vehicle 116 may be retained for a predetermined period of time (e.g., 1 hour, 24 hours, 30 days), before being deleted.

Data may include unique information identifying user 110. User 110 may create a user profile with application server 104 and access his profile using an application on mobile device 130, provided by application server 104. The profile information may include the user's name, address, phone number, email address(es), a username and password, driver's license number, license plate number, VIN number for vehicle 116, the make and model of vehicle 116, and other identifying information. The user may use the application to associate mobile device 130, vehicle 116, and/or sensors 118 with his profile. Conditions server 102 may communicate with application server 104 to receive the profile information. The profile information may be received by user profile module 206 and stored in database 150. Sensor data may be transmitted from sensors 118 to mobile device 130. Mobile device 130 may transmit the data to conditions server 102.

Figure 2:
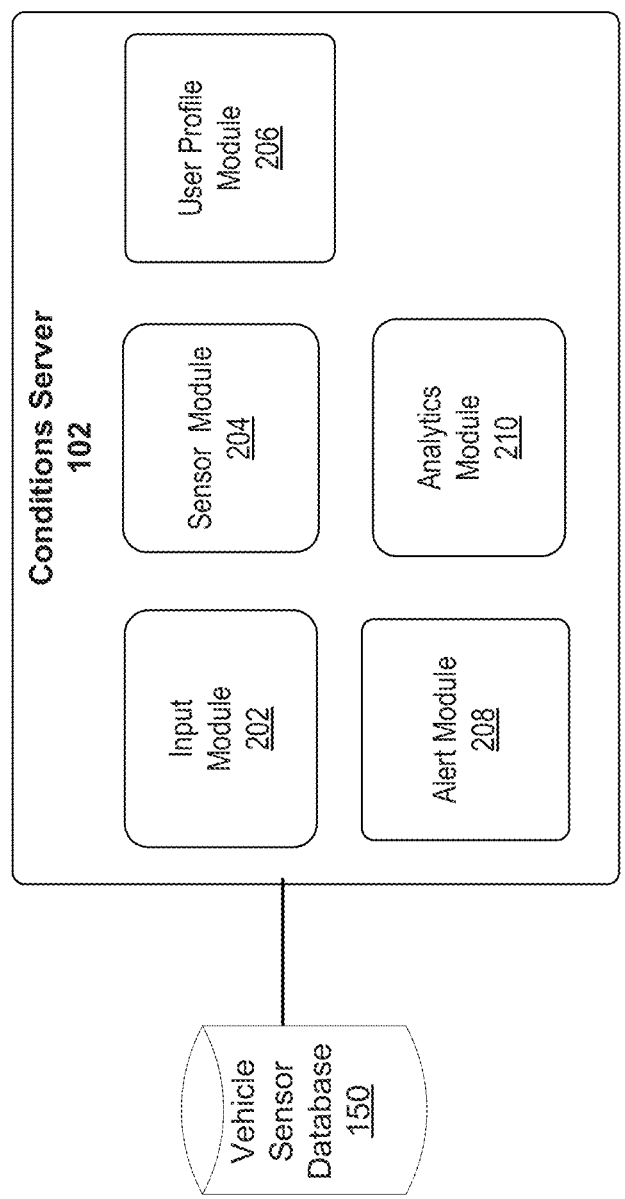
FIG. 2 depicts a block diagram of a hardware module for determining road conditions based on driver data, according to an example embodiment of the invention.

Conditions server 102 may include an input module, a sensor module, a user profile module, an alert module, and an analytics module, as described herein in reference to FIG. 2. In various embodiments, conditions server 102 may be a resolution server or may be a module of, or communicatively coupled to, a Domain Name System ("DNS") server, such as a BIND server, for converting host names and domain names into IP addresses over the Internet. Conditions server 102 may comprise one or more network enabled computers. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. In other embodiments, the operations performed by conditions server 102 may be implemented as part of an application on mobile device 130 and/or at display 140 of vehicle 116. It is noted that the modules 202, 204, 206, 208, and 210 are exemplary and the functions performed by one or more of the modules may be combined with that performed by other modules. The functions described herein as being performed by the modules 202, 204, 206, 208, and 210 also may be separated and may be located or performed by other modules. Moreover, the modules 202, 204, 206, 208, and 210 may be implemented at other devices of the system 100 (e.g., mobile device 130, display 140, and/or network element 120).

Sensor data from the vehicle's TCU device, or sensors 118 or other sensors (such as sensors within mobile device 130 and/or fixed sensors 114) may be transmitted to input module 202 by mobile device 130 and/or directly from sensors 118, or the data may be retrieved by a processor at input module 202. In an exemplary embodiment, the sensor data may include drive data, location data, time data, and/or response data. Drive data may comprise sensor data from a TCU device on vehicle 116, examples of which are enumerated above. Location data may comprise the location of a vehicle (or TCU device) or the location of mobile device 130. Time data may be a timestamp associated with both the drive data and the location data such that the system knows when the particular data was recorded. Response data may comprise information retrieved from user 110 in response to an alert previously sent to user 110. Data received via input module 202 may be relayed to other modules of conditions server 102.

Some types of sensor data, such as weather data, may be gathered less frequently than other data because such data does not change as frequently as data from sensors 118. Accordingly, such data (e.g., weather data) may be gathered every several minutes, such as every 10-15 minutes, for example. After input module 202 receives (or retrieves) data, the data may be stored in user profile module 206 and/or database 150 and associated with the user profile associated with mobile device 130 and/or vehicle 116. Data may be stored for a predetermined amount of time. The data may be updated or appended with additional data each time new sensor data is received. In various embodiments, database 150 and/or user profile module 206 may maintain sensor data for the previous 60 minutes for each user having a user profile. A user may opt-in using mobile device 130 to have sensor data from sensor 118 periodically provided to conditions server 102. This may be provided as part of a larger telecommunications application on mobile device 130.

Sensor module 204 may analyze the sensor data received by input module (e.g., sensor data from sensors 118 and/or mobile device 130). Sensor module 204 may compare the sensor data to one or more thresholds. Non-limiting examples of thresholds include a "bump" threshold, a "swerve" threshold, a "skid" threshold, a "brake" threshold, a "temperature" threshold, or combinations of these. The "bump" threshold may be based on a predetermined measurement that corresponds to a sudden movement of a vehicle in the vertical direction, as measured by an accelerometer. A vehicle may experience a "bump" in response to driving over a pothole or speed bump, for example. The "swerve" threshold may be based on a predetermined measurement that corresponds to a sudden movement of a vehicle in a horizontal plane, as measured by an accelerometer. The "swerve" threshold may also be based on a sudden turning motion in the steering wheel and/or the vehicle wheels, as detected by one or more sensors in the vehicle. A vehicle may "swerve" to avoid an obstruction in the road, a dangerous road condition, a stopped car, an accident, an animal, or some other condition on the road. The "skid" threshold may be based on a predetermined measurement that corresponds to a sudden movement of a vehicle in a horizontal plane, as measured by an accelerometer. The "brake" threshold may be based on a predetermined measurement of a force applied to the brakes and an amount of time that the brakes are applied. The skid threshold may be used in conjunction with the brake threshold. The skid threshold may detect when a vehicle skids or slips when it hits a patch of water, oil, ice, or some other substance on the surface of the road that affects the vehicle's traction. The temperature threshold may be based on a predetermined temperature limit for the engine and/or the tires to measure the heat generated by the tires (e.g., if the tires suddenly began to skid and experienced a rapid temperature rise). Sensor module 204 may compare received sensor data to the various thresholds and determine whether a potentially dangerous condition exists based on the one or more comparisons. If the sensor data exceeds one or more of the thresholds, sensor module 204 may designate the location corresponding to the sensor data as a potentially dangerous road condition.

In one example, vehicle 116 may be driving on a road and drive over a pothole. Sensor 118 may include an accelerometer that detects the "bump" (e.g., a sudden jolt in the vertical direction for vehicle 116) and provides sensor data to mobile device 130 and/or directly to conditions server 102. Sensor module 204 may receive this sensor data from input module 202. Sensor module 204 may compare the data to one or more thresholds, including the "bump" threshold. If the sensor data exceeds the "bump" threshold, sensor module 204 may request additional sensor data for vehicle 116 from user profile module 206. In various embodiments, input module 202 may request additional sensor data from vehicle 116 that was stored locally on vehicle 116. User module 206 may retrieve additional sensor data for vehicle 116 using the user identifier. User module 206 may retrieve sensor data from within a predetermined time range. The time range may be based on the time stamp associated with the accelerometer data that triggered the "bump" threshold in sensor module 204. The time range may be from 10 seconds before the time indicated in the timestamp to 10 seconds following the timestamp. In various embodiments, mobile device 130 and/or network element 120 may receive the sensor data from sensors 118 and perform the threshold analysis before the data is transmitted to conditions server 102. If device 130 and/or network element 120 determine that the data does not exceed any thresholds, the data will not be transmitted to conditions server 102.

Sensor module 204 may receive sensor data from within the time range (e.g., from the 10 seconds before the "bump" to the 10 seconds after the "bump") and compare the sensor data to one or more other thresholds. For example, the sensor module 204 may determine whether the "swerve" threshold was triggered within that time range. If the sensor data from that time period includes video data and/or image data, sensor module 204 may analyze the video frames to determine whether they captured the images of the road and whether these frames indicate the presence of an obstruction/pothole. The sensor data may include location data, indicating the location of vehicle 116 at the time the sensor data was recorded by sensors 118 and/or device 130. Sensor module 204 may use the location data to retrieve additional sensor data from one or more fixed sensors 114 that are proximate to the location where the road condition was detected by the sensors 118 of vehicle 116.

If sensor module 204 determines that the sensor data from a vehicle triggers one or more of the predetermined thresholds, sensor module 204 may flag the location of the condition as being a monitored or "potentially dangerous" location. Sensor module 204 may flag the location as a potentially dangerous location in database 150. In this example, the location may be denoted as location "L". Analytics module 210 and/or sensor module 204 may then monitor the location L for a predetermined period of time.

Figure 3:
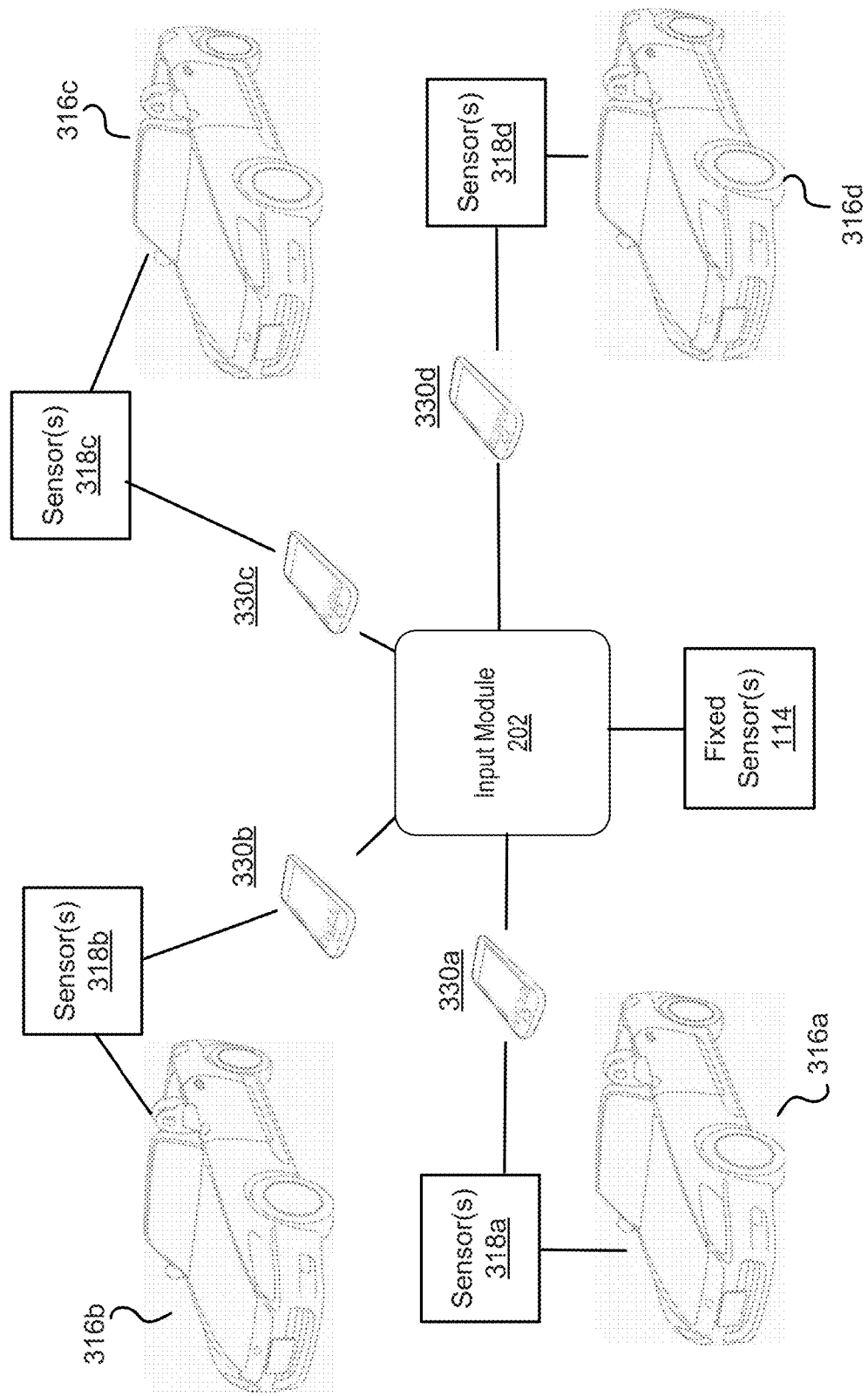
FIG. 3 depicts a block diagram of a system architecture for determining road conditions based on driver data, according to an example embodiment.

Analytics module 210 and/or sensor module 204 may monitor sensor data for other vehicles approaching location "L". Analytics module 210 may monitor sensor data from a plurality of other vehicles that drive past location "L". As shown in FIG. 3, multiple vehicles 316a-316d may be regularly providing sensor data to input module 202. Each vehicle may be associated with a mobile device and a user, and the sensor data for each vehicle may be stored with user profile module 206 and/or database 150. The sensor data for each vehicle may include location data indicating the location of the vehicle when the sensor data was recorded by the vehicle sensor(s) and/or the user's mobile device. If for example, vehicle 316a is approaching a pothole at location "L" and swerves to miss the pothole, sensor module 204 may detect this because the "swerve threshold" is triggered (i.e., the accelerometer data from vehicle 316a exceeds the swerve threshold). Sensor module 204 may designate location "L" as a potentially dangerous road condition. Analytics module 210 may then monitor sensor data from other vehicles (e.g., vehicles 316b-316d) that are approaching location "L", based on the location data received from the approaching vehicles. Analytics module 210 may monitor sensor data for a predetermined period of time following the time when the sensor data from vehicle 316a triggered one of the thresholds at sensor module 204. The predetermined time may be an hour, day, week, etc. The predetermined range of time may depend on the type of threshold triggered. For example, if a skid threshold was triggered by sensor data from vehicle 316a, then analytics module 210 may monitor sensor data from other vehicles approaching that location for the following hour. The predetermined range of time may depend on the location of the road condition (location "L"). If the location corresponds to a major highway with heavy traffic patterns, the predetermined range of time may be shorter (because more vehicles will pass that location in a shorter amount of time). The predetermined range of time may depend on the time when the threshold was triggered. For example, the predetermined range of time may be longer if the threshold was triggered after 9 pm, because fewer cars will be on the road at that time. The predetermined range of time may depend on the current weather conditions, as measured by sensor 114, vehicle sensors, and/or third-party sources. For example, the predetermined range of time may be set at one hour if the current weather indicates that a major rain storm just ended. In that case, analytics module 210 may set the predetermined range of time based on the estimated amount of time for any standing water on the road to evaporate or dry up. If analytics module 210 determines that the weather conditions are clear, the predetermined range of time may not be based on the current weather.

Analytics module 210 may receive the location data for each vehicle that passes within a predetermined distance of location "L". If the location data for a vehicle (e.g., vehicle 316b) indicates that vehicle 316b drove within a predetermined distance (e.g., 100 yards) of the location "L" where vehicle 316a swerved, analytics module 210 and/or input module 202 may transmit a request to vehicle 316b for other sensor data that was recorded during the time when vehicle 316b was within the predetermined distance of the location where vehicle 316a swerved. For example, if analytics module 210 receives location data from vehicle 316b that indicates that vehicle 316b drove past location "L", analytics module 210 may request additional sensor data from vehicle 316b during the period of time when vehicle 316b was within the predetermined distance of location "L". Upon retrieving sensor data for vehicle 316b, analytics module 210 may compare the additional sensor data to the various thresholds (e.g., the "swerve" threshold and the "bump" threshold). Analytics module 210 may perform these comparisons on additional sensor data (e.g., accelerometer data) that was recorded while vehicle 316b was within a predetermined distance of location L. The predetermined distance may be set by analytics module 210 based on the type of threshold that was triggered by vehicle 316a. For example, if vehicle 316a's sensor data triggered the "skid" threshold, analytics module 210 may set a lower predetermined distance (e.g., 10 yards from location L) based on the assumption that a stationary object or spill (e.g., a slick spot on the road, a pothole, spilled gravel, etc.) triggered the slip or skid. If vehicle 316a's sensor data triggered the "swerve" threshold, analytics module may set a higher predetermined distance (e.g., 100 yards from location L) based on the assumption that a movable object (e.g., an animal, an object on the road that may move when struck by a vehicle, etc.) triggered the swerve by vehicle 316a. If sensor data recorded by vehicle 316b during the period where it was within the predetermined distance of location "L" triggers the one or more thresholds, analytics module 210 may increment a conditions counter for location "L" in database 150. The conditions counter may keep track of how many vehicles have triggered a threshold at location "L". The conditions counter may initially be set at 1 based on vehicle 316a initially triggering the threshold.

If the conditions counter for location "L" reaches a predetermined number (e.g., a predetermined number of vehicles experience at "skid" event at location L), sensor module 204 may designate location "L" as a dangerous road condition, and alert module 208 may generate one or more alerts to be sent to other vehicles approaching location "L". The predetermined number may be five vehicles. The predetermined number may be based on the time of day. For example, if it is currently evening, the predetermined number may be only two vehicles. The predetermined number may be based on the type of event detected. For example, if the event is a "swerve" event, the predetermined number may be higher than for a "skid" event. The predetermined number may be based on the location. For example, if the event was detected on a major freeway, the predetermined number for the conditions counter may be 20 events within a five minute time range. If the event was detected on an isolated backroad, the predetermined number for the conditions counter may be 5 events within an hour time range. The predetermined number may be based on the current weather. The predetermined number may be based on some combination of these and other factors.

Alert module 208 may generate one or more alerts to be broadcast or multicast to other vehicles that are approaching that part of the road corresponding to the sensor data that caused one or more triggers (in this example, location L). The alert generated by alert module may be a text message, SMS, MMS, email, or in-app alert that is sent to a mobile device associated with the approaching vehicle. The alert may be sent to the display associated with the vehicle (such as display 140 shown in FIG. 1). The alert may be sent as an audible alert to be broadcast inside the vehicle. The alert may be sent to vehicles based on the vehicles location data, as detected by sensor module 204.

Figure 4B:
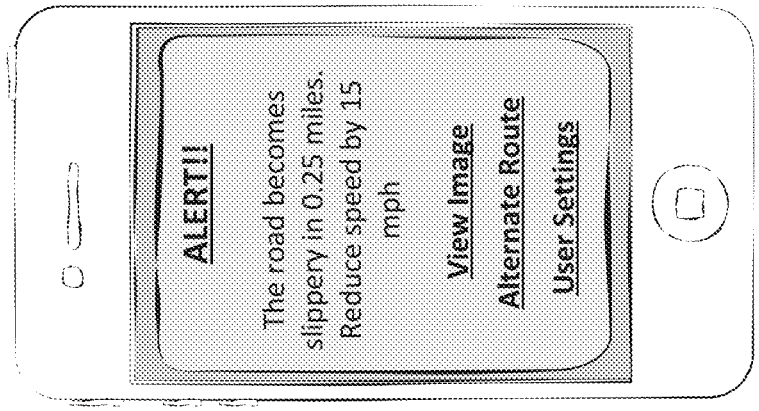
FIGS. 4A-4B depict embodiments of alerts received at a mobile device based on road conditions, according to an example embodiment of the invention.
Figure 4A:
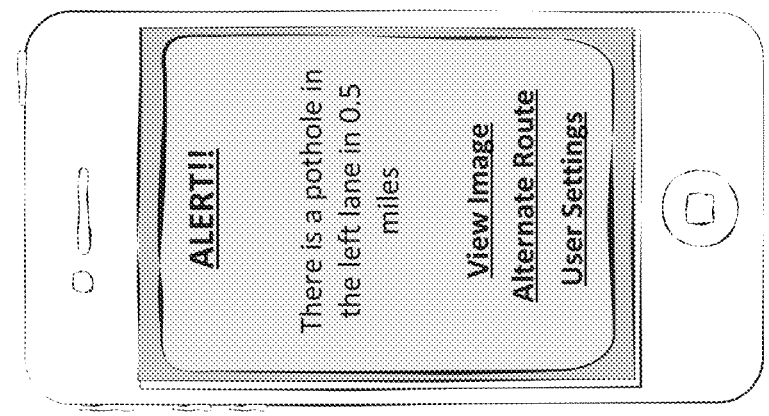

Returning to FIG. 3, assume vehicle 316d has previously opted-in to this service and is transmitting sensor data to input module 202 via mobile device 330d. Once conditions server 102 has determined that a dangerous road condition exists at the location where the pothole was detected (location L), sensor module 204 may compare received location data from other vehicles with this location (location L) to determine whether those vehicles are approaching the area where the dangerous condition exists. If vehicle 316d is on the road and approaching the dangerous condition, sensor module 204 may notify alert module 208 of this. This notification may occur once vehicle 316d is within a predetermined distance of the dangerous road condition (e.g., ½ mile, 500 yards, 1 mile, 500 feet). Alert module 208 may transmit one or more alerts to vehicle 316d and/or mobile device 330d. The alert may include information about the dangerous road condition. The alert may inform the driver how far away he is from the dangerous road condition (e.g., "there is a pothole in right lane approximately 0.25 miles ahead of you"). The alert may include one or more pictures of the road condition. The pictures may have been taken by sensors on vehicles 316a, 316b, and/or 316c. The pictures may have been taken by a fixed sensor near the location of the dangerous condition. An example embodiment of an alert is shown in FIG. 4A, as it would appear on the driver's mobile device. The alert includes a description of the dangerous condition, the distance to the dangerous condition, and options to view an image of the dangerous condition (e.g., an image captured by another vehicle's sensors and/or a fixed sensor). The alert includes the option of seeing an alternate route to avoid the road condition altogether. The alert may be sent to a vehicle based on the speed of that vehicle and the estimated time before the vehicle will come upon the dangerous road condition.

In various embodiments, the alert may include video data captured by other vehicles that have already passed the dangerous road condition. The video data may have been captured or recorded by a previous vehicle as it passed the dangerous road condition. This command may have been transmitted by interface module 202 to the vehicle. The alert may synchronize the video so that it plays for the approaching vehicle just as its location data indicates that it is approaching the location of the road condition. The video data could be synchronized to play at a speed corresponding to the speed of the approaching vehicle.

In various embodiments, the timing of when the alert is sent may vary depending on the how dangerous the road condition is. For example, if the road condition is a pothole or minor obstruction, the alert may be sent to approaching vehicles that are within a relatively short distance (e.g., ½ mile). If the road condition is a downed tree or downed powerline, the alert may be sent to approaching vehicles that are within a much larger distance radius (e.g., 5 miles away). In this way, vehicles may have time to take an alternate route and avoid the road entirely. The alert may include directions for an alternate route.

In various embodiments, alert module 208 may generate a work order to send to a third party entity that is in charge of maintaining the road (e.g., the public road maintenance department for that region). The work order may include the location of the area where the road condition was detected by the sensor data. The work order may include a description of the condition (e.g., a pothole, bump, downed tree, downed power line). The work order may include the date and time the condition was first detected using the sensor data. The third party may use the work order to perform repairs on the road at the location of the detected condition. In various embodiments, analytics module 210 and alert module 208 may generate work orders based on predicted changes to a road. The predicted changes may be based on traffic data received from one or more fixed sensors 114 (e.g., cameras, infrared sensors). Sensors 114 may record the number of vehicles and/or the speed of each vehicle that passes the fixed location of sensor 114. Analytics module 210 could aggregate the data from various sensors 114 and determine average traffic flows based on the time of day. Analytics module 210 could project future road conditions based on the average traffic flows, the age of the road, the timing of recent repairs, the weather conditions in the area, and other factors. Alert module 208 could generate a work order to send to a public entity that maintains the road.

In various embodiments, once sensor module 204 and/or analytics module 210 have designated that road location as "dangerous" in database 150, sensor module 204 and/or analytics module 210 may continue to pull sensor data from vehicles as they approach the dangerous location on the road to determine whether vehicles continue to swerve/skid/bump/brake at that location. In this way, conditions server 102 may process the data to determine whether the dangerous condition still exists and for how long alert module 208 should continue to generate and transmit alerts. If sensor module 204 does not detect abnormal sensor data at the dangerous road location for a predetermined amount of time and/or a predetermined number of passing vehicles (e.g., no abnormal sensor data from 20 passing vehicles), sensor module 204 may determine that the road at that location is no longer dangerous, and may remove that classification from database 150.

In one example, vehicle 316a may be traveling down a road and encounter a slippery road condition (e.g., caused by rain, ice, and/or oil spilled on the road) at location "B" on the road. Vehicle 316a may skid as it drives over the road, and the vehicle's TCU device 318a may record this skid. Sensor 318a may send the recorded data to mobile device 330a, which may transmit it to conditions server 102. The data may include the location "B" of the skid, the accelerometer data of the skid, and a time stamp (e.g., 3/14/2014 5:31:20 PM). The location data for location "B" may include latitude, longitude, and altitude coordinates. Sensor module 204 may compare the sensor data to the various thresholds. The sensor data may exceed the "skid" threshold. Based on this, user profile module 206 may retrieve other sensor data from database 150 and/or vehicle 316a for vehicle 316a. Sensor module 204 may designate location "B" as a potentially dangerous road condition. Analytics module 210 may begin monitoring location "B". Analytics module 210 may receive sensor data for other vehicles that drive past location "B" within a predetermined period of time. The period of time may be the next 60 minutes. In various embodiments, the time range may vary.

Analytics module 210 may start the conditions counter at "1" based on vehicle 316a. Analytics module 210 may increment the conditions counter for each subsequent vehicle that passes within a predetermined distance of location "B" and triggers the "skid" threshold (e.g., the sensor data from the other vehicles exceeds the skid threshold). If the conditions counter equals or exceeds a predetermined number within the next 60 minutes, alert module 208 may generate one or more alerts to be sent to other vehicles approaching location "B". The predetermined number may be five vehicles. The predetermined number may vary based on the time of day, location, weather, etc. For example, if it is currently evening, the predetermined number may be only two vehicles.

In various embodiments, alert module 208 may generate an alert for the initial vehicle 316a after it first transmits the sensor data that triggers the skid threshold. The alert may request feedback from the driver and solicit information about whether they encountered a road condition. The alert may be transmitted to a display device in vehicle 316a and/or mobile device 330a. For example, after skidding on the road at location "B", alert module 208 may transmit a message to device 330a and/or vehicle 316a that states, "Skid detected at [5:31:20 PM]. Did you encounter a slippery road condition?" The driver may then provide input by selecting, or audibly stating, either "Yes" or "No." If, "No," the driver may be prompted to provide information on the reason for the skid, or the skid may be ignored. If the driver responds "Yes", the alert module 208 may generate follow-up questions asking the driver to describe the what caused the skid (e.g., ice, rain, spilled substance on the road, etc.). Alert module 208 may then generate one or more alerts for approaching vehicles as described above, without having analytics module 210 or sensor module 204 monitor or retrieve additional sensor data from other vehicles. The alerts may include text, audio, links, graphics, pictures, video, animation, a slide show, a single image, and/or a collection of images, for example. The alerts may include a spoken message so as to limit or avoid interruptions to the driver. Moreover, the alert may comprise instructions to reduce the volume, mute, or pause other audio sources in the vehicle (or on the mobile device), such as the radio, an internal hard drive, a video, or a CD player, for example.

The alert may be unique to the vehicle. For example, before sending an alert to a given vehicle, input module 202 and/or sensor module 204 may retrieve the current speed of that vehicle. If vehicle 316b is approaching the location "B" where the slippery road condition was encountered by vehicle 316a, input module 202 may retrieve vehicle 316b's current speed. Sensor module 204 may determine whether vehicle 316b is driving dangerously fast as it approaches location "B". Sensor module 204 may make this determination based on the size of vehicle 316b, the vehicle type, weight, the posted speed limit on the road, whether the dangerous condition at location "B" is on a straight section or curved section of the road, the time of day, and other factors. Sensor module 204 may determine how fast vehicle 316b should be going as it approaches location "B". Alert module 208 may generate one or more alerts with this information. An example embodiment of an alert is shown in FIG. 4B on a driver's mobile device. As shown, the alert includes information about the nature of the dangerous condition, the distance from vehicle 316b to the road condition, and instructions for the driver to reduce the speed of vehicle 316b by 15 mph. The alert may be an audible alert.

In various embodiments, if sensor module 204 detects an event (e.g., sensor data received from a vehicle exceeds one or more thresholds), analytics module 210 may retrieve sensor data from a plurality of other vehicles that have driven over the same road in the past. If for example, vehicle 316a is approaching a pothole and swerves to miss the pothole, sensor module 204 may detect this because the "swerve threshold" is triggered (i.e., the accelerometer data from vehicle 316a exceeds the swerve threshold). Analytics module 210 may then search database 150 for sensor data from other vehicles (e.g., vehicles 316b-316d) that have driven on the same road, based on the location data associated with the sensor data for vehicle 316a. Analytics module 210 may search for sensor data from within a certain range of time leading up to the time when the sensor data from vehicle 316a triggered one of the thresholds at sensor module 204. The range of time may be the previous hour, day, week, etc. In various embodiments, vehicles 316b-316d may have only been transmitting location data to conditions server 102, and storing the remaining sensor data locally at each vehicle. Analytics module 210 may retrieve the location data for each vehicle and compare it to the location where vehicle 316a swerved. If the location data for a vehicle (e.g., vehicle 316c) indicates that vehicle 316c drove within a predetermined distance (e.g., 100 yards) of the location where vehicle 316a swerved, analytics module 210 and/or input module 202 may transmit a request to vehicle 316c for other sensor data that was recorded during the time when vehicle 316c was within the predetermined distance of the location where vehicle 316a swerved. Analytics module 210 may compare this sensor data to the one or more thresholds, and increment the counter for each past vehicle that triggered the threshold.

In various embodiments, the timing and/or nature of the alert may be based on the driver's characteristics (e.g., age, driving history). Younger or newer drivers and/or elderly drivers may receive more alerts and/or earlier alerts than experienced drivers. Drivers with a good driving history may receive fewer alerts than drivers with a bad record (e.g., a history of speeding tickets, accidents, etc.). The driver's history may be stored in database 150 and/or user profile module 206. The driver's history may be received from third party sources (e.g., insurance company, DMV, etc.).

In various embodiments, if sensor module 204 receives sensor data from a vehicle (e.g., vehicle 316c in FIG. 3) that surpasses a threshold, sensor module 204 may create a vehicle monitor alert in database 150 for vehicle 316c. Thereafter, sensor module 204 may continue to pull sensor data from vehicle 316c for a predetermined period of time (e.g., the next hour, the next day, the remainder vehicle 316c's current trip). Sensor module 204 may monitor sensor data for this period of time to detect other incidents (e.g., additional swerves or skids detected by sensors 318c and/or mobile device 330c). If sensor module 204 detects a predetermined number of additional events (e.g., 2 additional swerve events), alert module 208 may generate one or more alerts to vehicle 316c, indicating that he or she should use more caution when driving, slow down, or pay attention to the road.

Sensor module 204 may also retrieve sensor data from other vehicles with a predetermined location nearby vehicle 316c. Sensor module 204 may review this data to determine whether other vehicles are swerving, braking, skidding, or taking other evasive maneuvers in proximity to vehicle 316c. Sensor module 204 may use the results to determine that vehicle 316c is driving erratically, and may generate additional alerts for vehicle 316c. Sensor module 204 may pull video sensor data from nearby vehicles and analyze the video data, or send it to a representative for human analysis to determine if vehicle 316c is driving erratically. Alert module 208 may generate one or more alerts and transmit them to vehicles that are proximate to vehicle 316c (based on the location data for the other vehicles relative to the location data for vehicle 316c, the timestamps for the received data, etc.).

Alerts may be transmitted from conditions server 102 to the vehicles over one or more networks, such as network 108 in FIG. 1. In various embodiments, alerts may be communicated directly from vehicle to vehicle. In one example, vehicle 316a may experience a "swerve" event on a road. Device 330a may perform all of the operations associated with conditions server 102, and may detect the swerve event based on the sensor data received from sensors 318a and/or the internal sensors on device 330a. Device 330a may locally generate an alert based on the event and record the location of the road condition based on the location of vehicle 316a when the swerve was detected. Device 330a may transmit the alert to other vehicles that may be behind it on the same road. Methods of vehicle-to-vehicle communication are described in U.S. application Ser. No. 12/840,821, filed on Jul. 21, 2010, which is incorporated herein by reference.

The alert may be communicated over a wireless network that other mobile devices are connected to (e.g., devices 330b, 330c, and 330d). The alert could be transmitted to a wireless hotspot, and from there to other devices and/or vehicles that are connected to the same hotspot. The alert could be broadcast wirelessly and include the geographic coordinates of the location where the condition was detected. Other devices in the area may receive the alert, such as device 330b. Device 330b may have the same functionality as device 330a (e.g., the same functionality as conditions server 102) may compare its current location to the location data in the alert, and determine whether device 330b/vehicle 316b is traveling on the same road and approaching the location where the event was first detected by vehicle 316a. If device 330b determines that vehicle 316b is on the same road and is approaching the site of the dangerous condition, device 330b may provide the alert to the driver of vehicle 318b. The alert may be similar to the alerts generated by alert module 208 of conditions server 102.

In other embodiments, a network component, such as transceiver 121 may receive the initial alert from device 330a (which includes the location data for the dangerous condition and a description of the event). Transceiver 121 may comprise one or more network-enabled computers to determine that a dangerous road condition is present at the location, and can transmit the alert to other vehicles/devices in the area that are traveling in the same direction as vehicle 330a.

Figure 5:
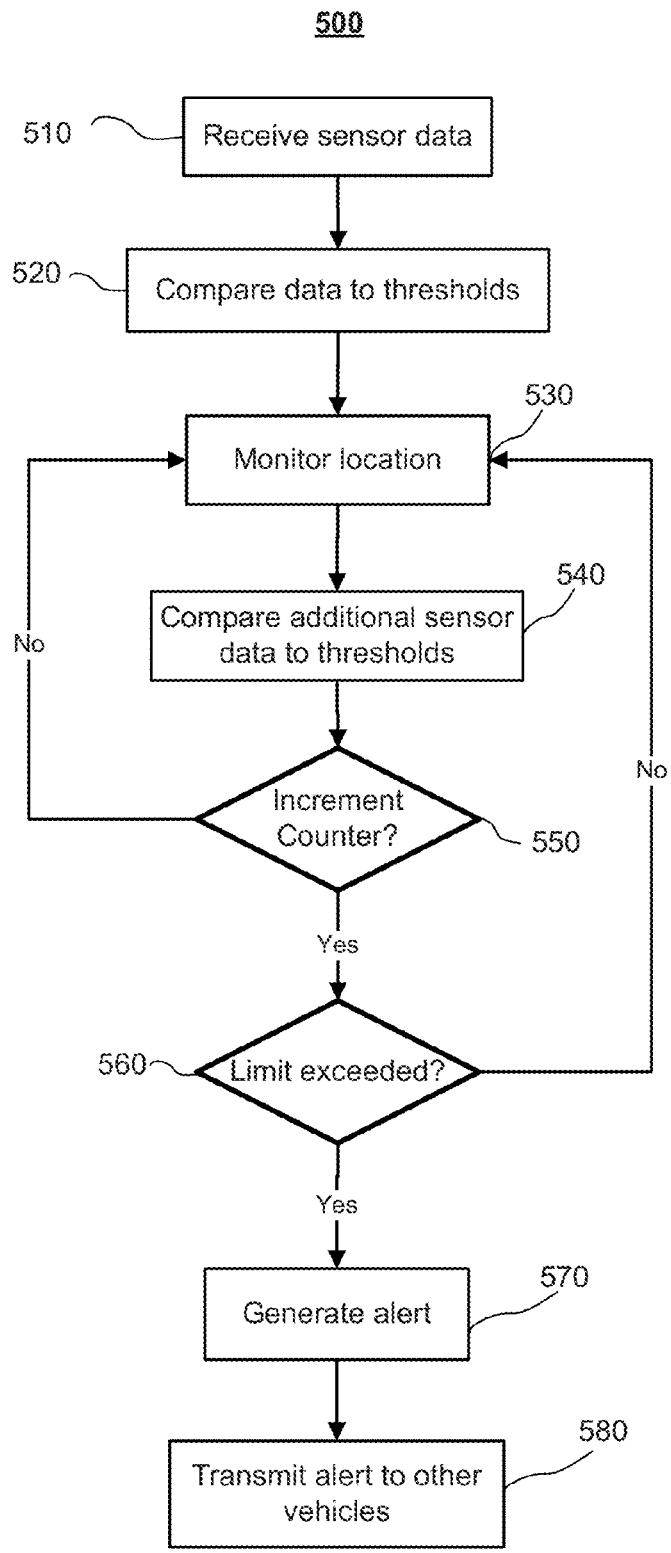
FIG. 5 depicts an illustrative flowchart of a method for generating intelligent alerts, according to an exemplary embodiment.

Referring to FIG. 5, an illustrative flowchart of a method for determining road conditions based on sensor data received from vehicles and mobile devices. This exemplary method 500 is provided by way of example, as there are a variety of ways to carry out methods according to the present disclosure. The method 500 shown in FIG. 5 can be executed or otherwise performed by one or a combination of various systems and modules. The method 500 described below may be carried out by system 100 shown in FIG. 1 and conditions server 102 shown in FIG. 2, by way of example, and various elements of the system 100 and conditions server 102 are referenced in explaining the exemplary method of FIG. 5. Each block shown in FIG. 5 represents one or more processes, decisions, methods or subroutines carried out in exemplary method 500, and these processes, decisions, methods or subroutines are not necessarily carried out in the specific order outlined in FIG. 5, nor are each of them required. Referring to FIG. 5, exemplary method 500 may begin at block 510.

At block 510, input module 202 of conditions server 102 may receive or retrieve data from the sensor(s) 118, directly or via network 108. The data from sensor(s) 118 may be relayed directly to other modules in conditions server 102. In this example, the data is received from sensors 318a and device 330a. The sensor data may include a user identifier, which identifies the driver and vehicle 316a. The sensor data may include the location (GPS, GLONASS), engine status, speed, stops, starts, temperature, acceleration values, nearby Wi-Fi signals, accelerometer data, gyroscope sensor information, height information from an altimeter, visual information from a camera communicatively coupled to sensors 318a, audio from a microphone, or revolutions per minute (RPM) of the vehicle's engine, and a timestamp, for example. In various embodiments, input module 202 may pull the sensor data by requesting it from device 330a and/or sensors 318a at regular intervals.

At block 520, sensor module 204 may compare the sensor data to one or more thresholds. The thresholds may include, without limitation, a bump threshold, a swerve threshold, a skid threshold, and a temperature threshold. In one example, vehicle 316a may be driving north on I-95 near midnight. An object from a vehicle ahead may have fallen out and landed in the left lane of I-95 north. Vehicle 316a may swerve to avoid the object, and an accelerometer at sensor 318a may detect this swerving motion and transmit the data to input module 202 via device 330a. The sensor data may include the accelerometer readings, the location (location "L1" on I-95 North, which may be transmitted as latitude, longitude, and altitude coordinates), the speed of vehicle 318a, a timestamp (6/20/2014, 11:50:22 PM), and an identifier for vehicle 316a and/or the user of device 330a. Sensor module 204 may compare the received accelerometer data to the swerve threshold.

In various embodiments, alert module 208 may generate an alert based on the result of the comparison in block 520. If the accelerometer data indicates that vehicle 316a swerved in a way that exceeds the swerve threshold, alert module 208 may generate an alert and transmit it to vehicle 316a and/or device 330a. The alert may solicit feedback from the user. The alert may state "The system detected a swerve—was there something in the road?" The user may respond to the alert using device 330a and/or a display on vehicle 316a, and the response may be transmitted to input module 202. The response may be provided to alert module 208.

At block 530, analytics module 210 and/or sensor module 204 may monitor the location L1 if the sensor data from vehicle 316a exceeds one or more of the thresholds. Analytics module 210 may receive a second set of sensor data. The second set of sensor data may be associated with a plurality of other vehicles. In this example, vehicle 316b may approach location "L1" on I-95. Vehicle 316b may be regularly transmitting its location to conditions server 102. Analytics module 210 may pull data from vehicles based on the location of each vehicle relative to the location of the first vehicle when it triggered one of the thresholds in block 520. While monitoring location L1, analytics module 210 may receive and/or retrieve data transmitted from vehicles at or near location "L1". Analytics module 210 may analyze, evaluate, and process the data pulled from vehicles at or near location L1. Analytics module 210 may search for data transmitted from vehicles within a predetermined distance of L1 (e.g., within 100 yards or less). Analytics module 210 may monitor location L1 for a predetermined period of time (e.g., for 1 hour following 11:55:22 PM). In this embodiment, vehicle 316b may approach location L1 around 11:59 PM. The driver of vehicle 316b may see the object in the left lane ahead of time and change lanes to avoid it. Sensors 318b may record this and store it at local storage in vehicle 316b. Analytics module 210 and/or input module 202 may receive location data from vehicle 316b for the period where vehicle 316b was within 100 yards of location "L1". Analytics module 210 may pull additional sensor data from sensors 318b and/or local storage on vehicle 316b. Analytics module 210 may note that the sensor data indicates a lane change as vehicle 316b was within 100 yards of location L1. Analytics module 210 may retrieve sensor data from one or more fixed sensors 114 proximate to location "L1" (e.g., a camera).

At block 540, analytics module 210 and/or sensor module 204 may compare the additional sensor data from vehicle 316b with the one or more thresholds. Analytics module 210 may determine that the sensor data from vehicle 316b exceeded the swerve threshold when vehicle 316b was within a certain predetermined distance of location "L1" (e.g., within 100 yards). In various embodiments, the predetermined distance may depend on the time of day, the location, the weather, and/or the type of threshold that was triggered by sensor data from vehicle 316a. Analytics module 210 may determine that the lane change by vehicle 316b near location "L1" was likely done to avoid the object in the road, based on the fact that it was executed within 100 yards of location L1 and done within the time range following the time when vehicle 316a swerved.

At block 550, analytics module 210 may increment a conditions counter for location L1 if the additional sensor data from vehicle 316b exceeded the one or more thresholds. If the additional sensor data from vehicle 316b does not exceed the one or more thresholds, analytics module 210 will not increment the conditions counter for location L1, and method 500 may return to block 530 and continue to monitor the location until the predetermined amount of time has elapsed.

At block 560, analytics module 210 may determine whether the conditions counter exceeds a conditions threshold. The conditions threshold may be a predetermined number of other vehicles that transmitted sensor data that triggers the one or more thresholds within the predetermined amount of time (in this example, 1 hour following 11:55:22 PM). The conditions threshold may vary depending on the location of L1, the time of day, the weather conditions, the type of threshold that was initially triggered by the first vehicle (vehicle 316a), and other factors. If the conditions threshold is not exceeded, method 500 may return to block 530. If the conditions threshold is exceeded, method 500 may proceed to block 370.

At block 370, alert module 208 may generate one or more alerts based on the results from block 560. Alert module 208 may generate an alert if a minimum number of other vehicles transmitting sensor data that triggers the one or more thresholds when the one or more other vehicles were proximate to location L1 within the predetermined time range exceeds the conditions threshold for that location. The minimum number in this example may be at least 1 other vehicle in the 1 hour following 11:50:22 PM (when vehicle 316a swerved at location L1). Alert module 208 may generate an alert that includes information about the condition: "There is an obstruction ahead in the left lane." The alert may include images or video of the location L1 recorded by sensors on passing vehicles (e.g., vehicles 316a and/or 316b). The alert may be generated if vehicle 316a responded affirmatively to a query that was transmitted to vehicle 316a after it triggered a threshold. The alert may include an interactive map showing alternate route to avoid the object in the road.

At block 580, alert module 208 may transmit the alert to one or more vehicles that are approaching location L1. In this example, sensor module 204 may receive location data from vehicle 316c indicating that vehicle 316c is driving north on I-95 and is 10 miles from location L1. Alert module 208 may transmit an alert to device 330c and/or a display device on vehicle 316c based on the location and speed of vehicle 316c, the time of day, the weather, and driver characteristics. The alert may be transmitted when vehicle 316c is within a predetermined distance of location L1 (e.g., 1 mile). The distance may depend on the factors described above (e.g., time of day, weather, vehicle characteristics, driver characteristics, vehicle speed). The alert may be a text message, SMS, MMS, email, video alert, or audible alert that can be heard by the driver of vehicle 316c. The alert may include how far the vehicle 316c currently is from location L1.

In an aspect, application server 104 may keep track of alerts sent to particular vehicles, and may perform analysis of data from sensors 118 to determine whether the particular vehicles that received the alerts heeded the warnings contained in them and slowed or swerved to avoid the cause of the alert. The result of the analysis of the telematics/performance data from the vehicles that received alerts may be used to adjust insurance premiums. For example, if a particular driver of one of the vehicles that received alerts disregards warnings of hazardous road conditions on a regular basis, a rating factor may be generated that is used to increase an insurance premium for the particular vehicle, or driver thereof.

In various embodiments, one or more of the steps of method 500 may be performed by the sensor device (or devices) on the vehicle (e.g., sensor 318a), a mobile device associated with the vehicle (e.g., mobile device 330a), network devices associated with the vehicle, display devices, and/or a remote server (e.g., conditions server 102).

The various computing devices above (including phones and network equipment), generally include computer-executable instructions, where the instructions may be executable by one or more processors. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

Databases, data repositories or other data stores described herein, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    receiving, by a device, a first set of sensor data from one or more sensors associated with a first vehicle,
        the first set of sensor data comprising locational data of the first vehicle and at least one other parameter;
    comparing, by the device, the first set of sensor data with at least one threshold from a first set of thresholds;
    monitoring, by the device, a location associated with the locational data of the first vehicle for a first time period based on the first set of sensor data exceeding the at least one threshold from the first set of thresholds;
    receiving, by the device, a second set of sensor data associated with a second vehicle that passes within a predetermined distance of the location during the first time period;

comparing, by the device, the second set of sensor data with at least one threshold from a second set of thresholds;

incrementing, by the device, a counter based on the second set of sensor data exceeding the at least one threshold from the second set of thresholds;

generating, by the device, at least one alert based on the counter exceeding a value,
the value representing a number of vehicles that transmitted a set of sensor data, exceeding the at least one threshold from the second set of thresholds, within a predetermined time period;

receiving, by the device, a third set of sensor data associated with a third vehicle,
the third set of sensor data comprising locational data of the third vehicle; and transmitting, by the device, the at least one alert to a mobile device associated with the third vehicle based on the third set of sensor data.

2. The method of claim 1, wherein the at least one other parameter comprises accelerometer data and a timestamp, and
wherein the second set of sensor data comprises locational data, accelerometer data, and a timestamp.

3. The method of claim 1, wherein the first set of thresholds comprises at least one of a bump threshold to detect a sudden vertical motion by a vehicle, a swerve threshold to detect a sudden swerving motion of a vehicle, a skid threshold to detect a sudden skidding motion of a vehicle, or a temperature threshold to detect a sudden temperature increase in a region of a vehicle.

4. The method of claim 1, wherein the value is based on at least one of a current time, a weather condition, or the location.

5. The method of claim 1, wherein the at least one alert is one of a text-based alert, an audible alert, or a video alert.

6. The method of claim 1, wherein transmitting the at least one alert to the mobile device comprises:
transmitting the at least one alert to the mobile device based on the locational data of the third vehicle being within a second minimum distance of the locational data associated with the first vehicle and based on a change in the locational data of the third vehicle indicating that the third vehicle is approaching the location.

7. The method of claim 1, further comprising:
determining a road condition corresponding to the locational data of the first vehicle based on a result, of comparing the first set of sensor data with the at least one threshold from the first set of thresholds, and a result of comparing the second set of sensor data with the at least one threshold from the second set of thresholds,
the road condition comprising one of a pothole, an icy road, a slippery road, an accident, an obstruction, or an object.

8. The method of claim 7, wherein the at least one alert comprises:
a description of the road condition corresponding to the locational data of the first vehicle, and
a distance between a current location of the third vehicle and the locational data associated with the first vehicle.

9. The method of claim 1, further comprising:
transmitting an interactive alert to a communications device associated with the first vehicle based on the first set of sensor data exceeding the at least one threshold from the first set of thresholds; and
receiving a response to the interactive alert from the communications device associated with the first vehicle.

10. A system, comprising:
a processor; and
a memory comprising instructions that, when executed by the processor, cause the processor to:
receive a first set of sensor data from one or more sensors associated with a first vehicle,
the first set of sensor data comprising locational data of the first vehicle and at least one other parameter;
compare the first set of sensor data with at least one threshold from a first set of thresholds;
monitor a location, associated with the locational data of the first vehicle, for a first time period based on the first set of sensor data exceeding the at least one threshold from the first set of thresholds,
monitoring the location comprising receiving a second set of sensor data associated with a second vehicle that passes, within a predetermined distance of the location, during the first time period;
transmit an interactive alert to a communications device, associated with the first vehicle, based on the first set of sensor data exceeding the at least one threshold from the first set of thresholds;
receive a response to the interactive alert from the communications device associated with the first vehicle;
compare the second set of sensor data with at least one threshold from a second set of thresholds;
increment a counter based on the second set of sensor data exceeding the at least one threshold from the second set of thresholds;
generate at least one alert based on the counter exceeding a value;
receive a third set of sensor data associated with a third vehicle,
the third set of sensor data comprising locational data of the third vehicle; and
transmit the at least one alert to a mobile device or a display device, associated with the third vehicle, based on the third set of sensor data.

11. The system of claim 10, wherein the at least one other parameter comprises accelerometer data and a timestamp, and
wherein the second set of sensor data comprises locational data, accelerometer data, and a timestamp.

12. The system of claim 10, wherein the first set of thresholds comprises at least one of a bump threshold to detect a sudden vertical motion by a vehicle, a swerve threshold to detect a sudden swerving motion of a vehicle, a skid threshold to detect a sudden skidding motion of a vehicle, or a temperature threshold to detect a sudden temperature increase in a region of a vehicle.

13. The system of claim 10, wherein the value is based on at least one of a current time, a weather condition, or the location.

14. The system of claim 10, wherein the at least one alert is one of a text-based alert, an audible alert, or a video alert.

15. The system of claim 10, wherein the instructions, when transmitting the at least one alert to the mobile device, cause the processor to:
transmit the at least one alert to the mobile device based on the locational data of the third vehicle being within a second minimum distance of the locational data, associated with the first vehicle, and based on a change in the locational data of the third vehicle indicating that the third vehicle is approaching the location.

16. The system of claim 10, wherein the instructions, when executed by the processor, further cause the processor to:

determine a road condition corresponding to the locational data of the first vehicle based on a result, of comparing the first set of sensor data with the at least one threshold from the first set of thresholds, and a result of comparing the second set of sensor data with the at least one threshold from the second set of thresholds,
  the road condition comprising one of a pothole, an icy road, a slippery road, an accident, an obstruction, or an object.

17. The system of claim 16, wherein the at least one alert comprises:
  a description of the road condition, corresponding to the locational data of the first vehicle, and
  a distance between a location of the third vehicle and the locational data of the first vehicle.

18. The method of claim 1, wherein the at least one alert comprises an interactive map showing an alternative route to avoid the location.

19. A non-transitory computer-readable medium storing instructions, the instructions comprising:
  one or more instructions that, when executed by one or more processors, cause the one or more processors to:
    receive a first set of sensor data from one or more sensors associated with a first vehicle,
      the first set of sensor data comprising locational data of the first vehicle and at least one other parameter;
    compare the first set of sensor data with at least one threshold from a first set of thresholds;
    monitor a location, associated with the locational data of the first vehicle, for a first time period based on the first set of sensor data exceeding the at least one threshold from the first set of thresholds,
      monitoring the location comprising receiving a second set of sensor data associated with a second vehicle that passes, within a predetermined distance of the location, during the first time period;
    compare the second set of sensor data with at least one threshold from a second set of thresholds;
    increment a counter based on the second set of sensor data exceeding the at least one threshold from the second set of thresholds;
    generate at least one alert based on the counter exceeding a value,
      the value representing a number of vehicles that transmitted a set of sensor data, exceeding the at least one threshold from the second set of thresholds, within a predetermined time period;
    receive a third set of sensor data associated with a third vehicle,
      the third set of sensor data comprising locational data of the third vehicle; and
    transmit the at least one alert to a mobile device or a display device, associated with the third vehicle, based on the third set of sensor data.

20. The non-transitory computer-readable medium of claim 19, where the one or more instructions that, when executed by the one or more processors, further cause the one or more processors to:
  determine a road condition corresponding to the locational data of the first vehicle based on a result, of comparing the first set of sensor data with the at least one threshold from the first set of thresholds, and a result of comparing the second set of sensor data with the at least one threshold from the second set of thresholds,
    the road condition comprising one of a pothole, an icy road, a slippery road, an accident, an obstruction, or an object; and
  where the one or more instructions, when generating the at least one alert based on the counter exceeding the value, cause the one or more processors to:
    generate a description of the road condition, corresponding to the locational data of the first vehicle, and
    generate a distance between a location of the third vehicle and the locational data of the first vehicle.

* * * * *